United States Patent Office 3,421,901
Patented Jan. 14, 1969

3,421,901
PRODUCING AROMATIC SOLUBLE COFFEE
James P. Mahlmann, Wayne, Norman R. Migdol, Carteret, and William W. Kaleda, Washington Township, N.J., assignors to General Foods Corporation, White Plains, N.Y., a corporation of Delaware
No Drawing. Continuation of application Ser. No. 453,470, May 5, 1965. This application July 5, 1966, Ser. No. 562,917
U.S. Cl. 99—7        6 Claims
Int. Cl. A23f 1/08

ABSTRACT OF THE DISCLOSURE

A bed of roasted and ground coffee is steamed under atmospheric conditions to release aromatic vapors, only those vapors released at temperatures of above 180° F. are collected. These aromas are then combined with coffee oil and added to the extract obtained from the steamed coffee. This aromatized extract when freeze-dried under controlled conditions produces a soluble coffee having a flavor and aroma similar to roasted and ground coffee and will produce a unique gas chromatographic spectrum not produced by any other coffee.

This application is a continuation of application Ser. No. 453,470, filed May 5, 1965, now abandoned, which application is a continuation-in-part of Ser. No. 252,038 filed Jan. 17, 1963, now abandoned, which was a continuation-in-part of Ser. No. 797,598 filed Mar. 6, 1959, now abandoned.

This invention relates to the aromatization of soluble coffee extract. More particularly, this invention is directed to a unique distribution of aromatic compounds never before produced in soluble coffee.

Development of present day soluble coffees has given rise to a need for a water soluble extract of roasted coffee which is capable of being rapidly reconstituted with boiling water to form a coffee beverage exhibiting a balanced aroma and cup flavor. The term "aroma" refers not only to smell but also concurrent taste effect. However, soluble coffee powders as prepared are deficient in the aroma found in fresh roasted and ground coffee. Because of the aqueous extraction and drying of the aqueous extract of ground coffee, a considerable portion of the volatile aromatic flavors which constitute aroma are lost in the process of dehydration of the aqueous extract to the dried powdered state. Various methods have been employed in an effort to replace the fugitive coffee aroma constituents. However, these processes have proven unsatisfactory in overcoming the flavor deficiency of the soluble coffee produced. The affinity of the aroma principles for the dried powder is low and the stability of the isolated aromatic flavors obtained by prior art techniques is extremely poor.

It would be desirable to provide a stable soluble coffee having a distinctive aroma and taste which more closely resembles that of freshly brewed roasted and ground coffee.

It has now been discovered that the objects of the present invention may be met by removing the desirable volatile aromatic constituents and coffee oil from freshly roasted coffee; said volatile aromatic constituents being derived by steaming a bed of roasted and ground coffee under at least atmospheric conditions to release volatile aromatic vapors from said bed of coffee, discarding the volatile aromatic vapors released at a temperature of below 180° F. and collecting those vapors released at a temperature of above 180° F., said vapors being collected over the last 1–20% of the total steaming time for said bed of coffee; cooling said collected vapors to below 70° F. to thereby stabilize the volatile aromatics collected, percolating the dearomatized coffee to obtain a coffee extract; and then combining the previously removed volatile aromatic constituents and coffee oil with at least a minor portion of the coffee extract.

The phrase "coffee oil" as it is employed herein is intended to embrace that oleaginous material recoverable by expression or solvent extraction from roasted coffee material. Expressed coffee oil is preferred and can be obtained by use of a conventional oil expeller. The oil obtained contains a small portion of fines which may be removed by clarifying the oil. The expeller cake which remains after the oil is expelled is pelletized and then added back at a low level to the roasted and ground coffee which is to be steamed. Advantageously, it is found that a greater proportion of more desirable low boiling coffee aroma constituents are recovered from expressed coffee oil in comparison to solvent extracted coffee oil.

The term "volatile aromatics" or "steam volatiles" is intended to refer to the aroma and flavor components derived by introducing steam into ground roasted coffee to wet the same and liberate volatile constituents at a pressure which is at or above atmospheric. Essentially, this consists of those vapors exiting from the bed of coffee at a temperature of between 180° to 230° F. Vapors issuing from the coffee at lower temperatures are discarded. The desirable vapors may be either fractionated (concentrated) or non-fractionated, depending on the steaming technique employed. In the case of a static bed of coffee, fractionation of the vapors is not necessary. However, with an agitated bed of coffee fractionation is necessary in order to further refine the vapors.

The volatiles are preferably obtained by introducing steam at the lower portion of an elongated column (a conventional percolator column) having a length at least 5–20 times its width and containing a packed bed of roasted and ground coffee particles having a particle size whereat at least 90% by weight of the particles are retained on a 40 mesh (U.S. Standard Sieve Screen). The steam enters the bed of coffee and due to the void spaces between the coffee particles will cause a process of internal reflux and rectification of the steam distilled volatiles along the tortuous paths of the coffee bed. Steam condenses on and wets the coffee particles to an extent which not only extracts but also generates volatile aromatics from the coffee. Steaming is continued until all of the coffee particles have been wet, say to 15–25% moisture, and the reflux and rectification interface or condition has reached the top of the bed of coffee and a quantity of co-distilled volatile organic acids have been separated from the desired volatile aromatics which issue from the top of the coffee bed as vapors at 180° to 230° F. These vapors are then collected and cooled to a stable temperature. Steaming time required to saturate the bed is usually at least 15 minutes, preferably 20–30 minutes, and the vapors are only collected for the final 10 minutes to give a yield of about 1–15 ml. (1–8 ml. when fractionated) of liquid condensate per pound of roasted coffee treated. Most preferably, the volatiles are passed through a fractionator column (also having a length 5 times its width) prior to cooling. The fractionator serves the purpose of removing organic acids and water from the aromatics.

It was unexpectedly discovered that when the steam volatile flavor obtained by the above described process is combined with coffee oil, the two coffee components act synergistically and the combination obtained produces a flavor effect which is superior to the expected additive effect. This synergistic effect is manifest when the two components are added to liquid extract prior to free-drying the extract. The two components complement each other to provide a highly desirable and useful flavor.

The term "freeze-drying" refers to the process in which a substantial portion of the moisture is removed by sublimation of the water molecules from a product containing moisture and solids in a frozen or ice state under high vacuum with the addition of sufficient heat to cause sublimation without melting the product. The product to be freeze-dried is first frozen to below its eutectic point and then subjected to treatment whereby the product is maintained at an extremely low temperature under high vacuum and subsequently the temperature is slowly raised, thereby permitting sublimation of the moisture from the product. In carrying out the present invention, it has been found desirable to maintain a temperature of at least below 10° F. until the product reaches a moisture of about 15–20%. Then the product temperature is slowly raised to not more than 110° F. during the final drying stage. The vacuum employed in the freeze-dryer is between 15 and 500 microns preferably between about 15 and 150 microns absolute pressure. The final product should have a moisture of between 1–3%. "Microns" refers to absolute pressures in microns of mercury.

The coffee oil and steam volatiles may be added either separately or together to the extract stream prior to drying. Also, the coffee oil may be mixed with the volatile steam aromatics and plated onto dried extract powder.

In the case where the oil and volatiles are mixed together it is preferred to physically separate the mixture after it separates into an oily layer or phase which is collected and an aqueous layer or phase which is discarded. This may be done by allowing the mixture to stand for several minutes or by centrifuging the mixture. It has been found that the desired results of the present invention are obtained when the steam volatile flavors are combined with coffee oil at a ratio of about 1:1 to 12:1, preferably 1:1 to 5:1 and most preferably 3:1. Ratios of less than about 1:1 do not provide a high enough concentration of flavor constituents in the oil and ratios greater than about 12:1 do not permit the oil to absorb all of the flavor constituents. While desired ratios of steam volatile flavor to coffee oil have been set forth, other less desirable ranges may also be employed, but at a loss in flavor effect. The combination of oil and volatile aroma may be plated onto dried soluble coffee at a level of about 0.2–2.0% of the powder (the amount of flavor composition employed being based on the weight of oil present), or added to the liquid extract of soluble coffee solids prior to drying, preferably by freeze-drying.

In the case where the oil and volatile aromatics are added separately to the extract, the coffee oil is employed at a level of 0.1% to 2% by weight of the soluble solids in the total liquid coffee extract. Preferably, it is employed at a level of 0.2% to 1.0%. At levels greater than about 2%, an excessive cloudiness is observed in the rehydrated product. However, oil which has been freeze-dried with extract and volatile aromas produces a product which results in far less turbidity at the 2% level in the coffee cup than does an oil which has been spray-dried. The oil as employed in the present invention is preferably first homogenized. It is preferred to homogenize the oil with a small portion of extract before it is added to separate portions of extract containing the other aroma components. Although the oil can be homogenized with the entire charge of extract to be dried, it is preferred that the oil be homogenized with a portion of the extract at pressures of between about 1,000 and 3,000 p.s.i.g. It has been found that pressures less than 1,000 p.s.i.g. provide inadequate dispersion of the coffee oil in extract and result in a separation of oil and extract which is too rapid. Since unfolded oil is employed at a level of 0.1 to 2.0% when folded oil (oil which has been concentrated by adding additional aroma removed from other batches of coffee oil) is used, it is preferred to employ this oil at a level of about 0.05 to 0.5%. The level of oil employed will vary inversely with the concentration of the folded aroma. While the oil is preferably homogenized, it may be dispersed in coffee extract by any convenient means, such as by adding it to extract prior to passing the extract through a votator.

The volatile steam aromatics are employed at a level of about 0.2 to 5% by weight of the soluble solids in the liquid extract. Preferably, these volatiles are added at a level of between 0.5 to 3%. It is preferred to employ a fractionated or concentrated steam distilled aroma wherefrom undesirable organic acidic components and other non-volatile organics have been previously removed. Concentration may be accomplished by physical separation (i.e. allowing the mixture to stand and separate into phases, centrifuging the mixture into phases), or by chemical separation (salting out). In addition to the removal of the organic acids and other organics, fractionation also permits removal of excess water. In the case of fractionated steam volatile aroma, the aroma is preferably a five-fold concentration of the unfractionated steam distilled aroma wherein the water, organic acid, and other undesirable organic compounds have been removed. When the fractionated aroma is employed, the level used is about 0.6–1% by weight of the soluble solids in the liquid extract. The fractionated steam volatile flavor, when combined with dispersed coffee oil (coffee oil homogenized with extract in aqueous coffee extract before freeze-drying), produces results which are far superior to those which would be expected ordinarily from the additive effect of the two components in an instant coffee product produced by any other technique. This can be confirmed organoleptically and by gas chromatography.

Freeze-dried coffee containing the volatile steam aromas and coffee oil specified herein will release a unique distribution of volatiles in the vapor phase of a hot brew of the soluble coffee product.

A comparison of the vapor phase of the coffee product of this invention with a representative sampling of the vapor phases of 33 other commercial soluble coffees, freeze-dried and spray-dried, reveals a difference in kind and not only degree as measured by gas chromatograph analysis:

TABLE 1

| Peak No. | Soluble coffee of this invention | Other soluble coffees |
| --- | --- | --- |
| 1 | 231–531 | 38–188 |
| 2 | 107,140–144,859 | 19,794–33,692 |
| 3 | 4,072–6,045 | 493–1,540 |
| 4 | 16,503–24,877 | 1,738–3,630 |
| 5 | 43,577–62,087 | 11,998–23,143 |
| 6 | 0–0 | 0–63 |
| 7 | 3,484–6,675 | 764–4,801 |
| 8 | 46,634–75,658 | 21,159–35,483 |
| 9 | 963–1,605 | 151–327 |
| 10 | 0–0 | 0–585 |
| 11 | 19,646–29,590 | 7,618–13,411 |
| 12 | 0–96 | 13–113 |
| 13 | 317–1,068 | 81–1,043 |
| 14 | 13,685–18,496 | 2,831–3,807 |
| 15 | 54,398–95,185 | 31,844–52,006 |
| 16 | 872–2,035 | 402–864 |
| 17 | 16,914–26,037 | 3,472–5,537 |
| 18 | 444–1,871 | 123–480 |
| 19 | 129–1,051 | 75–225 |
| 20 | 432–838 | 85–337 |
| 21 | 4,581–8,525 | 322–1,820 |
| 22 | 150,500–210,500 | 150,500–210,500 |
| 23 | 358,213–480,932 | 114,206–171,675 |
| 24 | .11–.15 | .07–.10 |
| 25 | 240,660–330,068 | 76,711–124,378 |
| 26 | 5,649–12,653 | 1,733–5,865 |
| 27 | 63,631–91,268 | 20,120–36,051 |
| 28 | 30,737–44,395 | 6,448–9,200 |
| 29 | 2,192–3,400 | 532–1,579 |

Of the many chemical compounds known to exist in soluble coffee, about 21 volatile peaks can be measured by gas chromatography. Of these 21 peaks, 14 specific compounds have been identified as present in major amounts at the specific peak identified.

The following table represents the peaks related to identified compounds and the relative retention time of the volatiles at each peak in regard to diethyl ketone as the standard (determined by dividing the time or distance for each peak from the point of injection to the point where the peak elutes out of the column by the time or distance of diethyl ketone eluting out of the column).

TABLE 2

| Peak No. | Constituent | Relative Ret. time to DEK |
|---|---|---|
| 1 | Unknown | 0.34–0.36 |
| 2 | Acetyldehyde | 0.37–0.38 |
| 3 | Methyl formate | 0.39–0.40 |
| 4 | Propionaldehyde | 0.42–0.43 |
| 5 | Acetone | 0.44–0.45 |
| 6 | Unknown | 0.46–0.47 |
| 7 | Methyl acetate | 0.48–0.49 |
| 8 | Isobutyraldehyde | 0.50–0.51 |
| 9 | n-Butyraldehyde | 0.58–0.59 |
| 10 | Unknown | 0.60–0.61 |
| 11 | Methyl ethyl ketone | 0.62–0.63 |
| 12 | Unknown | 0.63–0.65 |
| 13 | Ethanol | 0.68–0.69 |
| 14 | Diacetyl | 0.70–0.71 |
| 15 | Isovaleraldehyde | 0.77–0.79 |
| 16 | n-Valeraldehyde | 0.96–0.97 |
| 17 | 2,3-pentanedione | 1.11–1.12 |
| 18 | Unknown | 1.16–1.18 |
| 19 | do | 1.19–1.21 |
| 20 | do | 1.25–1.28 |
| 21 | N-methyl pyrrole | 1.29–1.32 |

Peak 22 is the standard, diethyl ketone. This is not part of the coffee composition.

Peak 23 represents the total volatiles measured in peaks 1–21.

Peak 24 represents a volatiles ratio (the sum of the counts in peaks 14+16 through 21 divided by the sum of peaks 1 through 13+15) which is believed indicative of consumer preference. This number will vary from 0.07 to 0.18, the higher the number, the better the flavor preference. Present soluble coffees have a value of between 0.07 to 0.10, indicating low consumer preference, the soluble coffee of this invention has values ranging from 0.11 to 0.18, indicating high consumer preference.

Peak 25 represents the sum of aldehyde peaks (2, 4, 8, 9, 15 and 16). Peak 26 is the sum of the two esters methyl formate and methyl acetate (peaks 3 and 7). Peak 27 is the sum of the ketones acetone and methyl ethyl ketone (peaks 5 and 11). Peak 28 is the sum of the diketones diacetyl and 2,3-pentanedione (peaks 14 and 17). Peak 29 is the sum of the unknown peaks 1, 6, 10, 12, 18 and 19.

Thus, defining the product of this invention in terms of known compounds present in coffee the following differences can be noted.

TABLE 3

| Constituent | Soluble coffee of this invention | Other soluble coffees |
|---|---|---|
| Acetaldehyde | 107,140–144,859 | 19,794–33,692 |
| Methyl formate | 2,099–6,045 | 493–1,540 |
| Propionaldehyde | 16,503–24,877 | 1,738–3,630 |
| Acetone | 43,577–62,087 | 11,998–23,143 |
| Methylacetate | 3,484–6,675 | 764–4,801 |
| Isobutyraldehyde | 46,634–75,658 | 21,159–35,483 |
| n-Butyraldehyde | 963–1,605 | 151–327 |
| Methyl ethyl ketone | 19,646–29,590 | 7,618–13,411 |
| Ethanol | 317–1,068 | 81–1,043 |
| Diacetyl | 13,685–18,496 | 2,831–3,807 |
| Isovaleraldehyde | 54,398–95,185 | 31,844–52,006 |
| n-Valeraldehyde | 872–2,035 | 402–864 |
| 2,3 pentanedione | 16,914–26,037 | 3,472–5,537 |
| Isobutylalcohol | 432–838 | 85–337 |
| N-methyl pyrrole | 4,581–8,525 | 322–1,820 |
| Diethyl ketone | 150,500–210,500 | 150,500–210,500 |
| Total volatiles | 331,245–503,580 | 102,752–181,441 |
| Volatile ratio | 0.12–0.12 | 0.07–0.07 |
| Sum of aldehydes | 226,510–344,219 | 75,088–126,002 |
| Sum of esters | 5,583–12,720 | 1,257–6,341 |
| Sum of ketones | 63,223–91,677 | 19,616–36,554 |
| Sum of diketones | 30,599–44,533 | 6,303–9,344 |
| Sum of alcohols | 749–0 | 166–1,380 |

In Table 3, the volatiles ratio is determined by dividing peak 14 (diacetyl), peak 16 (n-valeraldehyde), peak 17 (2,3-pentanedione), peak 20 (isobutylalcohol), and peak 21 (N-methyl pyrrole) by peak 2 (acetaldehyde), peak 3 (methyl formate), peak 4 (propionaldehyde), peak 5 (acetone), peak 7 (methyl acetate), peak 8 (isobutyraldehyde), peak 9 (n-butyraldehyde), peak 11 (methyl ethyl ketone), peak 13 (ethanol), peak 14 (diacetyl) and peak 15 (isovaleraldehyde).

This invention will now be described by reference to the following examples:

EXAMPLE I

About 600 lbs. of blended green coffee beans were subjected to a conventional roast at between 400° to 440° F. for about 15–20 minutes to yield 530 lbs. of roasted coffee. The roasted beans were then separated into a major portion (480 lbs.) and a minor portion (50 lbs.).

The minor portion (50 lbs.) of whole roasted coffee was introduced into a commercial oil expeller and expressed at 10,000 p.s.i.g. in a screw press wherein the screw had flights traveling within a complementary perforated cage or screen concurrent to the feed of coffee. About 4 lbs. of crude oil was obtained, which was then clarified by passing it through a commercial pressure filter to give 3.3 lbs. of clarified oil. The oil expression and clarification was carried out in a carbon dioxide atmosphere to prevent oil degradation. The clarified oil was then stored at 10° F. under carbon dioxide until ready for use. The expeller cake resulting from the expression of the coffee was then pelletized by extruding it through ⅜" die holes and cutting it into pellet lengths in the order of ⅜" to ½".

The major portion of roasted coffee (480 lbs.) was then ground to a particle size distribution wherein 90% by weight of the particles were retained on a 20 mesh U.S. Standard Screen. The pellets were added to the ground coffee and the mixture was introduced into a conventional commercial coffee extractor approximately 20" in diameter and 20' high to give a total coffee charge of about 500 lbs. Steam at a pressure of 5–10 p.s.i.g. was introduced into the bottom of the percolator and permitted to pass through the column of coffee to wet the coffee and distill voltile aromatics. The steam was allowed to pass through the column for a period of at least 25 minutes. Then, vapors from the top of the column were allowed to pass through a fractionator column (packed with ½" glass rings) 8' tall and 6" in diameter. The vapors, coming off at above 180° F., about 200°–230° F., were condensed in a brine condenser at 35° F. under a nitrogen atmosphere. About 1,100 ml. of the steam distillate was collected as a liquid condensate. The steam distillate collected in this manner was then held at 35° F. until it was used.

The steamed coffee was extracted with water under conventional coffee percolation techniques used in soluble coffee production. About 200 lbs. of soluble solids were extracted and collected as a liquid extract which weighed about 500 lbs. This extract had a soluble solids concentration of about 27%. About 50 lbs. of extract was removed from the main extract stream. About ¼ (0.8 lbs.) of the expressed oil was warmed to 65° F. and dispersed in the 50 lb. portion of extract by homogenization at 2,000 p.s.i.g. The homogenized oil was then added to the extract stream and the 1,100 ml. of steam distillate were mixed into the extract.

The aromatized extract now containing 0.4% of homogenized oil and 0.8% of steam distilled aroma was then frozen into a ½" thick layer of coffee extract by means of a freezing belt made of stainless steel. The belt was about 75' long, 30" wide, and was operated by two terminal pulleys which allowed the liquid extract about 60 minutes to be transported from one end of the belt to the other. Side skirts or retaining walls were used to keep the liquid extract on the belt as it was frozen. The belt was cooled by contact with 3 brine tanks, the first having a temperature of about 20° F. for the initial ⅓ portion of the belt, the second having a temperature of 5° F., and the third about −10° F. for the final ⅓ portion of the belt. In order to facilitate release of the frozen extract at the terminal portions of the belt, a water film (about 0.05" thick) was sprayed onto the initial portion of the belt and frozen to said belt. Then, liquid extract having a temperature just above the ice point (31° F.) was applied to the freezing belt and cooled to below its eutectic point of −13.5° F. in about 40 minutes by passing the extract over the brine tanks. The frozen extract issued from the terminal portion of the freezing belt at a product temperature of about −20° F. The frozen extract was removed from the belt by breaking off frozen slabs about 20″ long. This gave individual slabs having a dimension of about ½″ x 20″ x 30″.

The slabs of frozen coffee extract were then placed in a freeze dryer equipped with horizontal shelves and an internal condenser. The frozen extract was heated by platens spaced about 1/16″ from the frozen extract. A vacuum of 300 microns of mercury was drawn on the chamber, a condenser temperature of −40° F. was applied, and the platen temperature was raised to 120° F. The pressure was not allowed to rise above 500 microns. The condenser temperature of −40° F. was maintained for about 12 hours until the moisture of the coffee was reduced to about 10%. The platen temperature was then lowered to 95° F., the condenser temperature was lowered to −60° C. and the pressure reduced to below 150 microns. These conditions were maintained for about 5-6 hours until the coffee was dried to a moisture level of about 1.7%. The freeze drying chamber was released to atmosphere by injecting nitrogen into the system. The nitrogen thus penetrated into the pores or channels left by the ice sublimed from the extract. The dry slabs of coffee were then ground to a size wherein at least 90% of the particles were retained on a 40 mesh (U.S. Standard Sieve Screen), and plated with the remaining portion (2.5 lbs.) of the expressed coffee oil which was concentrated to a five-fold fraction weighing 0.5 lbs. Fivefold oil is obtained by distilling the aromas from expressed oil and then adding the aroma back to ⅕ of the original oil content. The freeze-dried coffee was not exposed to ambient conditions for more than 5 minutes prior to being packed in glass jars under a carbon dioxide head space, having less than 1% oxygen.

The freeze-dried coffee, having a final in-jar moisture content of about 2.2%, was stored at 95° F. for 3 months and, at the end of this time, exhibited no appreciable change in regard to flavor or flowability (caking).

Organoleptically, this product was distinguishable from a freeze-dried extract made from a similar blend of roasted and ground coffee, the coffee not being subjected to an aromatization treatment. Also, the product was distinguishable from freeze-dried coffee made with only one component of the above oil-volatile aroma combination. Moreover, the effect of combining the oil and volatile aroma fraction was more than additive from a flavor standpoint. This was confirmed by gas chromatography.

Analytical procedure—gas chromatography

A Perkin-Elmer Gas Chromatograph (Model 226) having a Leeds and Northrup Recorder, range 0–5 mv.; a Perkin-Elmer Printing Integrator, Model 194B; a Golay capillary type column coated with Ucon LB550X (0.2″ x 200′); and a flame ionization cell as the detector means was used. Helium pressure in the column was 7.5 p.s.i.g. Hydrogen pressure in the flame ionization cell was 12.5 p.s.i.g. Air pressure of 35 p.s.i.g. was used to flush out the detector. A block temperature of 200° C. was used to vaporize the volatiles. Detector housing temperature was set at 175° F. Temperature program for the analysis was set at 25° C. for 5 minutes and increased to 125° C. at a rate of 7.5° C. per minute and then kept at 125° C. for 20 minutes. Chart speed for plotting the chromatographic data was 0.5″ per minute. A #1 restrictor having a ratio of 100/1 vapor flow was used.

Each peak was described in counts, the counts being measured by the flame detector and recorded on the integrator. The number of counts for a particular component is directly proportional to the number of milligrams of that component in the vapor.

Using the above equipment and settings the flame detector was ignited, the integrator and recorder were turned on, and the unit allowed to warm up.

The recorder was synchronized with the integrator as follows:

(1) The attenuation was set at 200× and with the "coarse" and "fine" zero controls, the recorder was set at the baseline. With the integrator in the "manual" position, the "zero adjust" was moved to obtain no movement on the stroboscope disk.

(2) To obtain full-scale calibration on the recorder, the attenuation was set at 1, 2 or 5×. The "coarse" and/or "fine" zero controls were turned to send the recorder pen to full-scale on the chart paper. At this point, the "100% adjust" knob on the integrator was turned to obtain no apparent movement of the stroboscope disk.

(3) The first two steps were then repeated to be certain of synchronization.

(4) Prior to analyzing the samples, one microliter of 1% diethyl ketone (by weight) dissolved in distilled water was injected into the instrument using 500× attenuation and the above conditions. The peak usually eluted out at a distance of 135±5 mm. from the point of injection. If this value fell outside of these limits, a corresponding increase or decrease in the helium pressure was made.

(5) Using an analytical balance, 0.5000 gm. of the soluble powder was weighed and transferred with a funnel into a 25 ml. Erlenmeyer flask and stopper with a silicone plug. The flask was evacuated for twenty seconds by piercing the silicone plug with a hypodermic needle and barel connected to a vacuum line or pump. Four microliters of 1% diethyl ketone (internal standard) were added using a Hamilton volumetric syringe 10 microliter capacity, followed by 0.5 ml. of hot water, using a Becton-Dickinson syringe, 2 ml. capacity. The flask was then immersed into a boiling hot water bath for one minute, continually shaking the flask. Keeping the flask in the bath, the silicone plug was pierced with a hypodermic needle to restore the system in the flask to atmospheric pressure and then removed. The volume the vapor occupied was 17.5 ml. 2.5 ml. of the vapor was withdrawn using a Hamilton gas syringe, 2.5 ml. capacity, and quickly injected into the gas chromatography instrument. This was then measured by the integrator which was constantly corrected to the baseline. The integrated area for the respective peak was marked off.

(6) From past experience, the attenuation was set at 200× when analyzing spray dried soluble coffees. The magnitude of the gas chromatographic peaks that followed determined whether the attenuation was set at 200× or 100× thereafter. When freeze-dried soluble coffees were analyzed, the attenuation was set at 500×, since the volatile components were usually present in greater quantity for freeze-dried than for spray-dried soluble brews. Again the course of events dictated whether the attenuation should remain at 500× or decreased to 200× or 100×. However, prior to the elution of the diethyl ketone standard, the attenuation was always set at 500×. After the diethyl ketone was eluted out, the attenuation was reset to 100× or 200× for the remainder of the chromatogram.

The response of diethyl ketone standard varied from analysis to analysis. All peak areas were corrected in terms of the internal standard, diethyl ketone according to the following formula:

Corrected total peak counts relative to diethyl ketone $$= \frac{(\text{Peak counts measured}) \times (\text{Attenuation}) \times 100{,}000}{(\text{Diethyl ketone counts measured}) \times (\text{Attenuation})}$$

Calculating by this method placed all chromatographic results on a constant relative basis and comparisons could then be made for chemical differences.

Analysis of several samples of the above product according to the described technique gave average analysis as follows:

| Peak No. | Constituent | Relative Ret. time to DEK | Count |
|---|---|---|---|
| 1 | Unknown | 0.34-0.36 | 381 |
| 2 | Acetaldehyde | 0.37-0.38 | 126,000 |
| 3 | Methyl formate | 0.39-0.40 | 4,072 |
| 4 | Propionaldehyde | 0.42-0.43 | 20,690 |
| 5 | Acetone | 0.44-0.45 | 52,832 |
| 6 | Unknown | 0.46-0.47 | 0 |
| 7 | Methyl acetate | 0.48-0.49 | 5,079 |
| 8 | Isobutyraldehyde | 0.50-0.51 | 61,146 |
| 9 | n-Butyraldehyde | 0.58-0.59 | 1,284 |
| 10 | Unknown | 0.60-0.61 | 0 |
| 11 | Methyl ethyl ketone | 0.62-0.63 | 24,618 |
| 12 | Unknown | 0.63-0.65 | 32 |
| 13 | Ethanol | 0.68-0.69 | 692 |
| 14 | Diacetyl | 0.70-0.71 | 16,091 |
| 15 | Isovaleraldehyde | 0.77-0.79 | 74,791 |
| 16 | n-Valeraldehyde | 0.96-0.97 | 1,453 |
| 17 | 2,3 pentanedione | 1.11-1.12 | 21,475 |
| 18 | Unknown | 1.16-1.18 | 1,157 |
| 19 | do | 1.19-1.21 | 590 |
| 20 | do | 1.25-1.28 | 635 |
| 21 | N-Methyl pyrrole | 1.29-1.32 | 6,553 |
| 22 | Diethyl ketone | | 181,000 |
| 23 | Total volatiles | | 419,573 |

Volatiles ratio when computed by the formula (Ratio=Peaks 14+16 to 21÷Peaks 1-13+15) was 0.12 indicating a superior consumer preference.

Identification of the various compounds by mass spectrometry, infrared spectrometry, and gas chromatography retention time was confirmed by thin-layer chromatography.

Analytical procedure—thin-layer chromatography

Glass plates (20 x 20 cm.) were covered with a thin layer of silica gel by spreading an aqueous slurry of the gel at a thickness of about 0.25 mm. on the plates. The plates were dried and then placed on a horizontal conveyor which carried the plates underneath the exit of the gas chromatograph at the same speed as the recorder. The plates pass at a very short distance from the heated orifice of the exit line, cooling air being simultaneously blown to the opposite face of the plate. Substances which were not too volatile were almost quantitatively absorbed in the thin layer of silica gel. After gas chromatography of the coffee was completed the plates were developed by means of appropriate solvent, again dried, sprayed with a suitable revelator (such as 5 ml. concentrated $H_2SO_4$, 5 ml. anisaldehyde, and 90 ml. ethanol), and finally heated for about 10 minutes at 100° C. Spots immediately appeared but the colors were subject to change, becoming stable after 3-7 hours. The plates were then examined under ultraviolet light which permitted localization of spots otherwise invisible and characterization of products containing conjugated double-bond systems. The dried plates were very delicate and had to be protected prior to handling and storage. The plates were thus dipped in liquid paraffin, the layers then rapidly peeled off and fixed on cardboard. Examination of these plates gave the retention index of the spot under examination by superposition with the corresponding gas chromatograph recording (provided the recorder speed of the gas chromatograph was moving at the same speed as the plate); the $R_f$ value of a spot was indicative of the chemical nature of the substance involved (reference compounds run under identical conditions permitted tentative identification); and the color of the spot was typical and characteristic of certain compounds in question.

EXAMPLE 2

Fourteen hundred pounds of green coffee are introduced into a roaster of the type conventionally employed in the coffee industry. The coffee was roasted for about 18 minutes to a terminal roast temperature of 415° F. so as to yield approximately 1250 pounds of roasted coffee beans which were then ground to a particle size range whereat 95% remained on a 20 mesh screen (as measured by a U.S. Standard Sieve) and 5% remained on an 8 mesh screen. Approximately 1800 gms. of this ground coffee was then introduced to fill a glass extraction column 36" high, 4" inner diameter. Steam at between ½-¾ p.s.i.g. was introduced at the bottom of the column and the steam pressure maintained at input within this range throughout the steam flavor volatilization cycle, which lasted approximately 30 minutes. In such a cycle about 400 gms. of steam were supplied to the column. The input steam entered at the bottom of the column and passed upwardly motivated by the input steam pressure through the void space in the column.

As the steaming flavor volatilization proceeded, some slight amount of free watery liquid collected at the bottom of the column (less than 1% by weight of the roasted and ground coffee charge). After 20 minutes a condenser, cooled with cold water at 50° F., was connected to the top of the column and the vapors released from the coffee column were collected in the condenser. A gaseous, greenish ring of desired volatiles also developed above the top of the roasted and ground coffee bed in 25 to 28 minutes. The aroma constituents in this ring contained the essential aromas and were eventually collected in the condenser held at 35° to 50° F. About 5.6 ml. per pound of coffee treated was condensed. This condensate separated on standing into an oily layer and a watery layer, the oily layer being collected.

The oily layer containing the aromas was then combined with expressed coffee oil obtained from fresh roasted and ground coffee in a ratio of 3 parts by weight of aroma to 1 part of coffee oil.

Following the removal of the volatile aroma constituents, the roasted coffee was subjected to vacuum treatment by the application of a vacuum line pulling at least 15" of mercury which removed remaining acid vapors to raise the pH of the extract subsequently derived by percolation in the column. The liquid condensate was directly recycled into the percolated extract. The percolated extract was produced in a normal manner to give 26% solids. The steam volatile flavor condensate and and coffee oil was then admixed with the non-aromatic aqueous extract and spray dried in a spray dryer of conventional design to form a dry, free-flowing powder.

This product when analyzed according to the gas chromatographic method disclosed in Example 1 revealed the following chemical composition:

| Peak No. | Constituent | Relative ret. time to DEK | Counts |
|---|---|---|---|
| 1 | Unknown | 0.34-0.36 | 13 |
| 2 | Acetaldehyde | 0.37-0.38 | 46,426 |
| 3 | Methyl formate | 0.39-0.40 | 1,574 |
| 4 | Propionaldehyde | 0.42-0.43 | 5,639 |
| 5 | Acetone | 0.44-0.45 | 17,574 |
| 6 | Unknown | 0.46-0.47 | 0 |
| 7 | Methyl acetate | 0.48-0.49 | 1,311 |
| 8 | Isobutyraldehyde | 0.50-0.51 | 38,033 |
| 9 | n-Butylraldehyde | 0.58-0.59 | 262 |
| 10 | Unknown | 0.60-0.61 | 0 |
| 11 | Methyl ethyl ketone | 0.62-0.63 | 10,098 |
| 12 | Unknown | 0.63-0.65 | 262 |
| 13 | Ethanol | 0.68-0.69 | 13 |
| 14 | Diacetyl | 0.70-0.71 | 6,820 |
| 15 | Isovaleraldehyde | 0.77-0.79 | 63,344 |
| 16 | n-Valeraldehyde | 0.96-0.97 | 328 |
| 17 | 2,3 pentanedione | 1.11-1.12 | 10,230 |
| 18 | Unknown | 1.16-1.18 | 656 |
| 19 | do | 1.19-1.21 | 131 |
| 20 | do | 1.25-1.28 | 131 |
| 21 | N-methyl pyrrole | 1.29-1.32 | 1,574 |
| 22 | Diethyl ketone | | 181,000 |
| 23 | Total volatiles | | 204,419 |

EXAMPLE 3

Green coffee was introduced into a roaster of the type conventionally employed in the coffee industry. The coffee was roasted for about 18 minutes at a temperature of about 450° F. to yield approximately 1250 pounds of roasted coffee beans. The roasted coffee was ground and placed in a percolating vessel. The ground coffee particles were subjected to wet steam distillation by causing steam at about 3-5 p.s.i.g. to move upward through the system for about a 30 minute period at a rate of 1000 pounds per hour. The treatment with steam effected the release of organic coffee acid and volatile coffee flavor vapors from the roasted coffee and these passed upward and out of the percolating column.

The mixed vapors issuing from the percolator column in the last 10 minutes of the steaming period were conducted to the bottom of an elongated cylindrical fractionating column (12" in diameter and 15' long) which was completely packed with ½" glass rings. Prior to the introduction of the mixed vapors the fractionating column was cooled to about 55° F. by the passage of cold water through the column until the walls and contents of the fractionator reached the desired temperature. As the vaporous mixture was introduced and proceeded slowly upward in the packed column a condensate interface was observed to form on the surface of the glass rings immediately adjacent to the bottom of the column. This condensate interface when first formed was observed to be light yellow green in color and slowly moved upward in the column. As the condensate interface moved upward in the column, it increased in amount and darkened in greenish hue. Simultaneously, immediately beneath the ascending greenish interface was noted a reflux activity and the appearance of a clear condensate liquid moving toward the bottom of the column.

The first 2000 ml. of condensate appearing in the condenser attached to the top of the column was collected. These condensed vapors were found to contain substantially all of the active volatile flavor constituents free of excessive amounts of acid. The condensate recovered from the top of the fractional column was observed to have a pH of about 6 and a titratable acidity as measured by titration with a standardized sodium hydroxide solution of about 1.6. The condensate was oily in consistency and had a greenish brown color. The top fraction was composed substantially of aromatic coffee volatiles. The "tops" condensate had good stability when added to a nonvolatile aqueous extract or powder and was miscible in coffee oil. A clear liquid accumulated at the bottom of the column was drawn off. Upon analysis this liquid was observed to have a pH of about 2.5 and a total acid content of about 8.2. This "bottoms" fraction was in the liquid state and found to consist predominantly of water and organic acids chiefly acetic and caffeic acid.

The condensate fraction of aromatic flavor obtained from the top of the fractionator column was mixed with coffee oil at a ratio of two parts of flavor to one part of five-fold concentrated oil. This mixture was plated on soluble coffee powder (at a level of 2% by weight of the powder) obtained by extracting the roasted and ground coffee remaining in the steaming column after removal of the aromatic flavors.

This powder when analyzed according to the gas chromatograph method described in Example 1 revealed a chemical composition similar to that of the Example 2 product.

Reference can be made to the appended claims for a definition of the scope of this invention.

We claim:

1. A process for producing an aromatic soluble coffee which comprises removing the desirable volatile aromatic constituents and coffee oil from freshly roasted coffee; said volatile aromatic constituents being derived by steaming a bed of roasted and ground coffee under at least atmospheric conditions to release volatile aromatic vapors from said bed of coffee, discarding the volatile aromatic vapors released at a temperature of below 180° F. and collecting those vapors released at a temperature of above 180° F., said vapors being collected over the last 1–20% of the total steaming time for said bed of coffee; cooling said collected vapors to below 70° F. to thereby stabilize the volatile aromatics collected, percolating the dearomatized coffee to obtain a coffee extract; and then combining the previously removed volatile aromatic constituents and coffee oil with at least a minor portion of the coffee extract.

2. The process of claim 1 wherein the extract containing the oil and volatile aromas is freeze-dried.

3. The process of claim 1 wherein the extract containing the oil and volatile aromas is spray-dried.

4. The process of claim 1 wherein the volatile aromas are physically separated into an oily phase and a water phase, said oily phase being combined with the extract and oil prior to drying.

5. The process of claim 1 wherein the extract is dried and the volatile aromatics are concentrated to a five-fold fraction prior to being combined with said dried extract.

6. The process of claim 5 wherein the five-fold fraction is physically separated into an oily phase and a water phase, and said oily phase is plated on said dried extract.

References Cited

UNITED STATES PATENTS

| | | | |
|---|---|---|---|
| 2,292,447 | 8/1942 | Irwin | 99—199 |
| 2,513,813 | 7/1950 | Millevelle | 99—71 XR |
| 2,562,206 | 7/1951 | Nutting | 99—71 |
| 2,947,634 | 8/1960 | Feldman et al. | 99—71 |
| 3,035,922 | 5/1962 | Mook et al. | 99—71 |
| 3,132,947 | 5/1964 | Mahlmann | 99—71 |

MAURICE W. GREENSTEIN, *Primary Examiner.*

U.S. Cl. X.R.

99—199